(12) United States Patent
Irifune et al.

(10) Patent No.: US 6,573,355 B2
(45) Date of Patent: Jun. 3, 2003

(54) METHOD FOR PREPARATION OF ORGANOPOLYSILIXAME HAVING BRANCHED MOLECULAR STRUCTURE

(75) Inventors: Shinji Irifune, Matsuida-machi (JP); Masahiko Ogawa, Matsuida-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/901,633

(22) Filed: Jul. 11, 2001

(65) Prior Publication Data

US 2002/0007007 A1 Jan. 17, 2002

(30) Foreign Application Priority Data

Jul. 11, 2000 (JP) .......................... 2000-209445

(51) Int. Cl.$^7$ .......................... C08G 77/08; C08G 77/06
(52) U.S. Cl. .......................... 528/12; 528/14; 528/20; 528/32; 528/33; 528/37; 525/477
(58) Field of Search .......................... 528/12, 14, 20, 528/32, 33, 37; 525/477

(56) References Cited

U.S. PATENT DOCUMENTS

| | | | |
|---|---|---|---|
| 3,997,497 A | * 12/1976 | Itoh et al. ............. | 528/32 |
| 5,254,658 A | * 10/1993 | Ogawa et al. ............. | 528/14 |
| 5,312,947 A | * 5/1994 | Tsukuno et al. ............. | 556/450 |
| 5,965,683 A | 10/1999 | Nye et al. | |
| 6,417,310 B1 | * 7/2002 | Omura et al. ............. | 528/12 |

FOREIGN PATENT DOCUMENTS

| | | | |
|---|---|---|---|
| EP | 0 540 039 A1 | * 5/1993 | ............. C08G/77/06 |
| EP | 0 919 583 A2 | 6/1999 | |
| JP | 09-208701 | 8/1997 | |

OTHER PUBLICATIONS

Abstract of JP 09–208701, Kuniniro et al. Aug. 1997.
Copy of European Search Report for EP 01 40 1698.
Derwent English Abstract of JP 03–019267 A, Matsuoka et al. Jan. 1991.*

Machine translation from JPO web–site of JP 09–208701 Yamada et al. Aug. 1997.*

* cited by examiner

Primary Examiner—Robert Dawson
Assistant Examiner—Jeffrey B. Robertson
(74) Attorney, Agent, or Firm—Millen, White, Zelano & Branigan, P.C.

(57) ABSTRACT

The invention discloses a method for the preparation of an organopolysiloxane having a branched molecular structure which comprises the steps of:

(A) Mixing (A1) an organopolysiloxane represented by the average unit formula $$[R^1_3SiO_{1/2}]_m[R^1SiO_{3/2}]_n[R^1(R^2O)SiO]_q,$$

in which $R^1$ is a monovalent hydrocarbon group, $R^2$ is a hydrogen atom, methyl group or ethyl group and the subscripts m, n and q are each 0 or a positive number with the proviso that $(n+q)/m$ is from 0.6 to 1.5 and $q/(m+n)$ is 0 or a positive number not exceeding 0.05;

(A2) a cyclic dialkylsiloxane oligomer, and (A3) a polyorganosiloxane represented by the structural formula $$R^3_3Si\text{—O—}(\text{—}SiR^3_2\text{—O—})_r\text{—}SiR^3_3,$$

In which $R^3$ is a monovalent hydrocarbon group and the subscript r is 0 or a positive integer not exceeding 100, to give a siloxane mixture;

(B) admixing the siloxane mixture with an alkaline compound; and (C) heating the siloxane mixture to effect siloxane rearrangement polymerization of the organopolysiloxanes.

11 Claims, No Drawings

METHOD FOR PREPARATION OF ORGANOPOLYSILIXAME HAVING BRANCHED MOLECULAR STRUCTURE

BACKGROUND OF THE INVENTION

The present invention relates to a novel method for the preparation of an organopolysiloxane having a branched molecular structure as a class of silicone products, which is useful in a great variety of industrial application fields.

Among the great variety of silicone products, as is well known, those organopolysiloxanes prepared by utilizing the so-called hydrosilation reaction are particularly important and have usefulness in a wide field of applications. The above mentioned hydrosilation reaction is conducted usually between an alkenyl group-containing organopolysiloxane and an organohydrogenpolysiloxane having hydrogen atoms directly bonded to the silicon atoms in the presence of a catalytic amount of a platinum compound to promote the addition reaction.

The alkenyl group-containing organopolysiloxane pertaining to the hydrosilation reaction is not particularly limitative relative to the molecular structure depending on the desired products. When an alkenyl group-containing organopolysiloxane having a branched molecular structure is used, a product organopolysiloxane of good reactivity containing a controlled amount of the alkenyl groups at the molecular chain ends to comply with the requirements in different applications can be prepared by adequately selecting the number of branches in the starting alkenyl group-containing organopolysiloxane (see Japanese Patent Publication 3-19267 and Japanese Patent 2965231). However, only very few reports are available on the method for the preparation of such an alkenyl-terminated organopolysiloxane of a branched molecular structure and the only methods thus far disclosed are each very complicated to inhibit practical application of the method.

For example, Japanese Patent Publication 3-19267 proposes a method in which an alkyl trimethoxy silane and octamethyl cyclotetrasiloxane are subjected to a polymerization reaction in the presence of an alkaline catalyst and then this polymer is subjected to a hydrolysis-condensation reaction with tetramethyl divinyl disiloxane under an acidic condition and a method in which an alkyl trimethoxy silane is subjected to hydrolysis-condensation with tetramethyl divinyl disiloxane under an acidic condition followed by a polymerization reaction thereof with octamethyl cyclotetrasiloxane in the presence of an alkaline catalyst. These methods, however, are disadvantageous because, in addition to complicacy of the method as an industrial process, the viscosity of the final product can hardly be controlled with a large variation as a consequence of the alkaline polymerization in the presence of a large amount of the alkoxy groups and the reaction mixture is sometimes under a danger of bumping due to the water and/or alcohol contained therein.

SUMMARY OF THE INVENTION

The present invention accordingly has an object to provide, in view of the above described problems and disadvantages in the prior art methods, a novel and efficient industrial method for the preparation of an organopolysiloxane having a branched molecular structure from starting materials of good availability.

Thus, the present invention provides a method for the preparation of an organopolysiloxane having a branched molecular structure which comprises the steps of:

(A) Mixing (A1) from 1 to 100 parts by weight of a first organopolysiloxane represented by the average unit formula $$(R^1_3SiO_{1/2})_m(R^1SiO_{3/2})_n[R^1(R^2O)SiO]_q, \tag{I}$$

in which $R^1$ is, each independently from the others, a monovalent hydrocarbon group having 1 to 8 carbon atoms selected from the group consisting of alkenyl groups, alkyl groups and phenyl group, $R^2$ is a hydrogen atom, methyl group or ethyl group and the subscripts n, and q are each 0 or a positive number with the proviso that $(n+q)/m$ is in the range from 0.6 to 1.5 and $q/(m+n)$ is 0 or a positive number not larger than 0.05;

(A2) from 1 to 100 parts by weight of a cyclic dialkylsiloxane oligomer, and (A3) from 1 to 100 parts by weight of a polydiorganosiloxane represented by the structural formula $$R^3_3Si\text{—}O\text{—}(SiR^3_2\text{—}O)_r\text{—}SiR^3_3, \tag{II}$$

In which $R^3$ is, each independently from the others, a monovalent hydrocarbon group having 1 to 8 carbon atoms selected from the group consisting of alkenyl groups, alkyl groups and phenyl group and the subscript r is 0 or a positive integer not exceeding 100, to give a siloxane mixture;

(B) admixing the siloxane mixture with an alkaline compound; and (C) heating the siloxane mixture to effect siloxane rearrangement polymerization of the organopolysiloxanes (A1), (A2) and (A3).

In particular, it is preferable that at least one of the three $R^1$ groups in one of the siloxane units $(R^1_3SiO_{1/2})$ in the organopolysiloxane (A1) is an alkenyl group.

DETAILED DESCRIPTION OF THE PREFERRED EMBODIMENTS

The starting material in the method of the present invention is a combination of three kinds of organopolysiloxanes (A1), (A2) and (A3) mixed together in a specified mixing proportion to give a siloxane mixture. The organopolysiloxane (A1) is represented by the average unit formula (I) given above, in which each $R^1$ is, independently from the others, a monovalent hydrocarbon group having 1 to 8 carbon atoms selected from the group consisting of alkenyl groups such as vinyl, allyl, butenyl and pentenyl groups, alkyl groups such as methyl and ethyl groups and phenyl group and the subscripts m, n and q are each 0 or a positive number with the proviso that $(n+q)/m$ is in the range from 0.6 to 1.5 and $q/(m+n)$ is 0 or a positive number not larger than 0.05.

When the value of $(n+q)/m$ is smaller than 0.6, the number of the branching points in the branched-structure organopolysiloxane prepared by using such a starting organopolysiloxane is undesirably limited to 3 or less to cause a decrease in the usefulness of the product in applications. When the value of $(n+q)/m$ is larger than 1.5, the molar proportion of the units $R^1SiO_{3/2}$ is so large as to cause a difficulty in the preparation of the product organopolysiloxane. When the value of $q/(m+n)$ is larger than 0.05, the organopolysiloxane has a too large number of remaining alkoxy groups to cause instability or uncontrollability of the viscosity thereof.

The organopolysiloxane (A1) can be prepared by subjecting a mixture of a trialkoxy methyl silane, dialkenyl tetramethyl disiloxane and hexamethyl disiloxane in an alcoholic solution to a cohydrolysis reaction in the presence of an acidic catalyst followed by neutralization of the catalyst, removal of the by-product alcohol, washing with water and stripping of the unreacted reactants.

The second organopolysiloxane reactant (A2) pertaining to the reaction of the inventive method is a cyclic dialkylsiloxane oligomer including those represented by the general formulas $[Me_2SiO]_r$, $[EtMe\text{-}SiO]_t$ and $[PrMeSiO]_r$, in which Me is a methyl group, Et is an ethyl group, Pr is a propyl group and the subscript t is a positive integer of 3 to 10. These cyclic dialkylsiloxane oligomers can be used either singly or as a combination of two kinds or more.

The third organopolysiloxane reactant (A3) pertaining to the reaction of the inventive method is a diorganopolysiloxane having a linear molecular structure as represented by the above given general formula (II), in which each $R^3$ is, independently from the others, a monovalent hydrocarbon group having 1 to 8 carbon atoms exemplified by alkenyl groups such as vinyl, allyl, butenyl and pentenyl groups, alkyl groups such as methyl and ethyl groups and aryl groups such as phenyl group and the subscript r is 0 or a positive integer not exceeding 100.

The mixing proportion of the three organopolysiloxane reactants (A1), (A2) and (A3) is selected depending on several parameters characterizing the desired organopolysiloxane product having a branched molecular structure such as the average degree of polymerization and number of the branching points in a molecule to meet the intended application. Namely, the amount of each of the reactants (A1) to (A3) can be in the range from 1 to 100 parts by weight without particular limitations.

The reaction of the above described reactant organopolysiloxanes according to the inventive method is carried out in the presence of an alkaline compound as a catalyst to promote the reaction. Suitable alkaline compounds as the catalyst include alkali metal hydroxides such as potassium hydroxide and sodium hydroxide as well as the reaction products between an alkali metal hydroxide and a dimethylpolysiloxane prepared separately. The amount of the alkaline catalytic compound is selected in such a way that the molar ratio of the alkali metal in the catalytic compound to the silicon atoms in the organopolysiloxanes is in the range from $10^{-5}$ to $10^{-3}$.

The siloxane rearrangement polymerization reaction of the three reactant organopolysiloxanes according to the inventive method is conducted at a temperature of 100 to 180° C. taking 4 to 12 hours. The organopolysiloxane mixture can be diluted by the addition of an organic solvent which can be selected from the organic solvents conventionally used in the siloxane rearrangement polymerization of organopolysiloxanes without particular limitations. It is further optional that the reaction mixture is admixed with an organopolysiloxane of a different type than the above described (A1) to (A3).

The method of the present invention is described in the following in more detail by way of Examples, which, however, never limit the scope of the invention in any way, as preceded by the description of the preparation procedures of the respective reactant organopolysiloxanes. The term of "vinyl equivalent" appearing in the following refers to the number of moles of the vinyl groups contained in 100 g of the organopolysiloxane. The values of viscosity are all the values obtained by the measurement at 25° C. and the viscosity values of the product organopolysiloxanes are given in the unit of MPa·s.

Preparation 1

An organopolysiloxane, referred to as the organopolysiloxane (a) hereinafter, satisfying the definition of the organopolysiloxane (A1) was synthesized in the following manner. Thus, a reaction mixture obtained by mixing 544 g of methyl methoxy silane, 372 g of tetramethyl divinyl disiloxane and 200 g of isopropyl alcohol was admixed with 9.0 g of methanesulfonic acid and then 129.6 g of water were added dropwise into the reaction mixture at such a rate that the temperature of the reaction mixture never exceeded 70° C. to effect cohydrolysis of the silane and siloxane compounds. The reaction mixture was then neutralized by the addition of 16 g of sodium hydrogencarbonate and the methyl alcohol formed as a by-product was removed by distillation under normal pressure followed by washing with water and stripping of residual volatile matters to give 490 g of a clear liquid organopolysiloxane having a viscosity of 30 centipoise. This organopolysiloxane (a) was analyzed by the methods of NMR, IR and GPC and could be identified to be expressed by the average unit formula

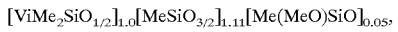

in which Me is a methyl group and Vi is a vinyl group.

Preparation 2

Another organopolysiloxane, referred to as the organopolysiloxane (b) hereinafter, satisfying the definition of the organopolysiloxane (A1) was synthesized in the following manner. Thus, a reaction mixture obtained by mixing 544 g of methyl methoxy silane, 324 g of hexamethyl disiloxane and 200 g of isopropyl alcohol was admixed with 9.0 g of methanesulfonic acid and then 129.6 g of water were added dropwise into the reaction mixture at such a rate that the temperature of the reaction mixture never exceeded 70° C. to effect cohydrolysis of the silane and siloxane compounds. The reaction mixture was then neutralized by the addition of 16 g of sodium hydrogencarbonate and the methyl alcohol formed as a by-product was removed by distillation under normal pressure followed by washing with water and stripping of residual volatile matters to give 430 g of a clear liquid organopolysiloxane having a viscosity of 20 centipoise. This organopolysiloxane (b) was analyzed by the methods of NMR, IR and GPC and could be identified to be expressed by the average unit formula

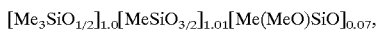

in which Me is a methyl group.

Preparation 3

A third organopolysiloxane, referred to as the organopolysiloxane (c) hereinafter, which was similar to the organopolysiloxanes (a) and (b) but did not fall within the definition of the organopolysiloxane (A1) was synthesized in the following manner. Thus, a reaction mixture obtained by mixing 544 g of methyl methoxy silane, 324 g of tetramethy divinyllyl disiloxane and 200 g of isopropyl alcohol was admixed with 9.0 g of methanesulfonic acid and then 108 g of water were added dropwise into the reaction mixture at such a rate that the temperature of the reaction mixture never exceeded 70° C. to effect cohydrolysis of the silane and siloxane compounds. The reaction mixture was then neutralized by the addition of 16 g of sodium hydrogencarbonate and the methyl alcohol formed as a by-product was removed by distillation under normal pressure followed by washing with water and stripping of residual volatile matters to give 495 g of a clear liquid organopolysiloxane having a viscosity of 25 centipoise. This organopolysiloxane (c) was analyzed by the methods of NMR, IR and GPC and could be identified to be expressed by the average unit formula

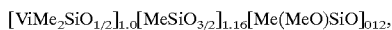

in which Me is a methyl group and Vi is a vinyl group.

EXAMPLE 1

A reaction mixture consisting of 115 g of the organopolysiloxane (a), 8880 g of octamethyl cyclotetrasiloxane and 159 g of tetramethyl divinyl disiloxane with admixture of 0.72 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7790 g of a clear and colorless liquid product, referred to as the organopolysiloxane I hereinafter, in a yield of 85% based on the calculated amount. The overall working time was 24 hours and no bumping of the reaction mixture under heating took place during the procedure. No difficulty was encountered in the filtration of the product organopolysiloxane. The organopolysiloxane I had a viscosity of 247 MPa·s and a vinyl equivalent of 0.026 mole/100 g which was close to the calculated value of 0.027 mole/100 g.

The organopolysiloxane I could be expressed by the functionality formula of $M_3D_{150}T_1$, in which M, D and T denote the monofunctional, difunctional and trifunctional siloxane units, respectively.

EXAMPLE 2

A reaction mixture consisting of 288 g of the organopolysiloxane (a), 8510 g of octamethyl cyclotetrasiloxane and 119 g of tetramethyl divinyl disiloxane with admixture of 0.65 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7670 g of a clear and colorless liquid product, referred to as the organopolysiloxane II hereinafter, in a yield of 86% based on the calculated amount. The overall working time was 24 hours and no bumping of the reaction mixture under heating took place during the procedure. No difficulty was encountered in the filtration of the product organopolysiloxane. The organopolysiloxane II had a viscosity of 300 MPa·s and a vinyl equivalent of 0.034 mole/100 g which coincided with the calculated value.

The organopolysiloxane II could be expressed by the functionality formula of $M_6D_{230}T_4$, in which M, D and T denote the monofunctional, difunctional and trifunctional siloxane units, respectively.

Separately, the same polymerization reaction as above was carried out in a larger scale by using a reactor of 2 m³ capacity to obtain 1550 kg of the product organopolysiloxane IIa in a yield of 87% of the calculated amount. This organopolysiloxane IIa had a viscosity of 298 MPa·s and a vinyl equivalent of 0.034 mole/100 g.

EXAMPLE 3

A reaction mixture consisting of 576 g of the organopolysiloxane (a), 8214 g of octamethyl cyclotetrasiloxane and 144 g of tetramethyl divinyl disiloxane with admixture of 0.65 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7680 g of a clear and colorless liquid product, referred to as the organopolysiloxane III hereinafter, in a yield of 86% based on the calculated amount. The overall working time was 24 hours and no bumping of the reaction mixture under heating took place during the procedure. No difficulty was encountered in the filtration of the product organopolysiloxane. The organopolysiloxane III had a viscosity of 188 MPa·s and a vinyl equivalent of 0.055 mole/100 g which was close to the calculated value of 0.056 mole/100 g.

The organopolysiloxane III could be expressed by the functionality formula of $M_{10}D_{222}T_8$, in which M, D and T denote the monofunctional, difunctional and trifunctional siloxane units, respectively.

EXAMPLE 4

A reaction mixture consisting of 864 g of the organopolysiloxane (a), 7918 g of octamethyl cyclotetrasiloxane and 170 g of tetramethyl divinyl disiloxane with admixture of 0.65 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7790 g of a clear and colorless liquid product, referred to as the organopolysiloxane IV hereinafter, in a yield of 87% based on the calculated amount. The overall working time was 24 hours and no bumping of the reaction mixture under heating took place during the procedure. No difficulty was encountered in the filtration of the product organopolysiloxane. The organopolysiloxane IV had a viscosity of 143 MPa·s and a vinyl equivalent of 0.076 mole/100 g which was close to the calculated value of 0.078 mole/100 g.

The organopolysiloxane IV could be expressed by the functionality formula of $M_{14}D_{214}T_{12}$, in which M, D and T denote the monofunctional, difunctional and trifunctional siloxane units, respectively.

EXAMPLE 5

A reaction mixture consisting of 286 g of the organopolysiloxane (b), 8510 g of octamethyl cyclotetrasiloxane and 107 g of hexamethyl disiloxane with admixture of 0.65 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7750 g of a clear and colorless liquid product, referred to as the organopolysiloxane V hereinafter, in a yield of 87% based on the calculated amount. The overall working time was 24 hours and no bumping of the reaction mixture under heating took place during the procedure. No difficulty was encountered in the filtration of the product organopolysiloxane. The organopolysiloxane V had a viscosity of 260 MPa·s and a vinyl equivalent of 0.012 mole/100 g which was close to the calculated value of 0.013 mole/100 g.

The organopolysiloxane V could be expressed by the functionality formula of $M_{2.3}M'_{3.7}D_{230}T_4$, in which D and T denote the difunctional and trifunctional siloxane units, respectively, and M and M' denote the monofunctional siloxane units relative to the dimethylvinyl-siloxy and trimethylsiloxy groups, respectively.

Comparative Example 1

A reaction mixture consisting of 272 g of trimethoxy methyl silane, 8510 g of octamethyl cyclotetrasiloxane and 279 g of tetramethyl divinyl disiloxane with admixture of 0.72 g of potassium hydroxide was heated in a reactor of 10 liter capacity under an atmosphere of nitrogen gas at a temperature of 150° C. for 8 hours and then, while keeping the temperature at 150° C., 162 g of water were added to the reaction mixture dropwise to effect the hydrolysis and demethanolation reactions taking further 8 hours, during which several times of bumping of the reaction mixture took place. Thereafter, the reaction mixture was admixed with an additional 0.36 g of potassium hydroxide and heated at 150° C. for 6 hours to effect the siloxane rearrangement re-equilibration reaction and then neutralized by heating at 150° C. for 2 hours with admixture of 2.0 g of ethylene chlorohydrin followed by stripping of volatile matters under reduced pressure and filtration to give 7360 g of a clear and colorless liquid product, referred to as the organopolysiloxane VI hereinafter, in a yield of 82% based on the calculated amount. The overall working time was 48 hours. No difficulty was encountered in the filtration of the product organopolysiloxane. The organopolysiloxane VI had a viscosity of 293 MPa·s and a vinyl equivalent of 0.034 mole/100 g in coincidence with the calculated value.

The organopolysiloxane VI could be expressed by the functionality formula of $M_6D_{230}T_4$, in which M, D and T denote the monofunctional, difunctional and trifunctional siloxane units, respectively.

Separately, the same procedure as above was carried out in a larger scale by using a reactor of 2 m³ capacity to obtain 1480 kg of the product organopolysiloxane VIa in a yield of 83% of the calculated amount. This organopolysiloxane VIa had a viscosity of 250 MPa·s and a vinyl equivalent o 0.034 mole/100 g.

Comparative Example 2

A mixture consisting of 544 g of trimethoxy methyl silane, 8214 g of octamethyl cyclotetrasioxane and 465 g of tetramethyl divinyl disiloxane with admixture of 0.72 g of potassium hydroxude was heated in a reactor of 10 liter capacity under an atmosphere of nitrogen gas at 150° C. for 8 hours to effect the polymerization reaction. The reaction mixture was then admixed with 162 g of water dropwise by keeping the temperature at 150° C. to effect the hydrolysis and demethanolation reaction. The reaction, however, could not be continued due to an undue increase of the viscosity leading to complete gelation of the reaction mixture. The above given formulation with the starting organosilicon compounds corresponded to a functionality formula of $M_{10}D_{222}T_8$, in which M, D and T denote the monofunctional, difunctional and trifunctional siloxane units, respectively.

Comparative Example 3

A reaction mixture consisting of 282 g of the organopolysiloxane (c), 8510 g of octamethyl cyclotetrasiloxane and 133.7 g of tetramethyl divinyl disiloxane with admixture of 0.72 g of potassium hydroxide was heated in a reactor of 10 liter capacity under an atmosphere of nitrogen gas at a temperature of 150° C. for 8 hours to effect the siloxane rearrangement polymerization. Thereafter, the reaction mixture was neutralized by heating at 150° C. for 2 hours with admixture of 1.5 g of ethylene chlorohydrin followed by stripping of volatile matters under reduced pressure and filtration to give 7765 g of a clear and colorless liquid product, referred to as the organopolysiloxane VIII hereinafter, in a yield of 87% based on the calculated amount. The overall working time was 30 hours and no bumping of the reaction mixture occurred during the procedure. Difficulty was encountered in the filtration of the product organopolysiloxane. The organopolysiloxane VIII had a viscosity of 319 MPa·s and a vinyl equivalent of 0.034 mole/100 g in good coincidence with the calculated value.

The organopolysiloxane VIII could be expressed by the functionality formula of $M_6D_{230}T_4$, in which M, D and T denote the monofunctional, difunctional and trifunctional siloxane units, respectively.

Separately, the same polymerization reaction as above was carried out in a larger scale by using a reactor of 2 m³ capacity to obtain 1550 kg of the product organopolysiloxane VIIia in a yield of 87% of the calculated amount. This organopolysiloxane VIIIa had a viscosity of 267 MPa·s and a vinyl equivalent o 0.034 mole/100 g.

What is claimed is:

1. A method for the preparation of an organopolysiloxane having a branched molecular structure which comprises the steps of:
   (A) mixing:
      (A1) from 1 to 100 parts by weight of an organopolysiloxane represented by the average unit formula

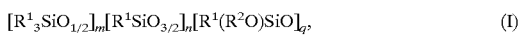
      $[R^1_3SiO_{1/2}]_m[R^1SiO_{3/2}]_n[R^1(R^2O)SiO]_q$, (I)

in which $R^1$ is, each independently from the others, a monovalent hydrocarbon group having 1 to 8 carbon atoms, $R^2$ is a hydrogen atom, methyl group or ethyl group subscripts m, is a positive number and the subscript n and q are each 0 or a positive number with the proviso that (n+q)/m is in the range from 0.6 to 1.5 and q/(m+n) is 0 or a positive number not exceeding 0.05;
      (A2) from 1 to 100 parts by weight of a cyclic dialkylsiloxane oligomer, and
      (A3) from 1 to 100 parts by weight of a polyorganosiloxane represented by the structural formula

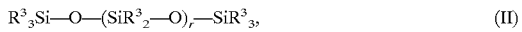
      $R^3_3Si$—O—$(SiR^3_2$—O$)_r$—$SiR^3_3$, (II)

in which $R^3$ is, each independently from the others, a monovalent hydrocarbon group having 1 to 8 carbon atoms and the subscript r is 0 or a positive integer not exceeding 100,
      to give a siloxane mixture;
   (B) admixing the siloxane mixture with an alkaline compound; and
   (C) heating the siloxane mixture from (B) to effect siloxane rearrangement polymerization of the organopolysiloxanes (A1), (A2) and (A3).
2. The method for the preparation of an organopolysiloxane having a branched molecular structure as claimed in claim 1 in which the monovalent hydrocarbon group denoted by $R^1$ is selected from the group consisting of alkyl, alkenyl and aryl groups.
3. The method for the preparation of an organopolysiloxane having a branched molecular structure as claimed in claim 2 in which at least one of the three $R^1$ groups in the unit formula $[R^1{}_3SiO_{1/2}]$ of the organopolysiloxane (A1) is an alkenyl group.

4. The method for the preparation of an organopolysiloxane having a branched molecular structure as claimed in claim 1 in which the cyclic dialkylsiloxane oligomer (A2) is octamethyl cyclotetrasiloxane.

5. The method for the preparation of an organopolysiloxane having a branched molecular structure as claimed in claim 1 in which the polyorganosiloxane (A3) is tetramethyl divinyl disiloxane or hexamethyl disiloxane.

6. The method for the preparation of an organopolysiloxane having a branched molecular structure as claimed in claim 1 in which the alkaline compound is an alkali metal hydroxide or a reaction product thereof with a methylpolysiloxane.

7. The method for the preparation of an organopolysiloxane having a branched molecular structure as claimed in claim 6 in which the amount of the alkaline compound is in such a range that the molar ratio of alkali metal element in the alkali metal hydroxide to the silicon atoms in the siloxane mixture is in the range from $10^{-5}$ to $10^{-3}$.

8. The method for the preparation of an organopolysiloxane having a branched molecular structure as claimed in claim 1 in which the temperature of heating in step (C) is in the range from 100° C. to 180° C.

9. The method of claim 1, wherein the cyclic dialkylsiloxane oligomer is of one of the formulae: $[Me_2SiO]_t$, $[EtMeSiO]_t$ or $[PrMeSiO]_t$, in which Me is a methyl group, Et is an ethyl group, Pr is a propyl group and the subscript t is a positive integer of 3 to 10.

10. The method of claim 1, wherein, in formula (II), $R^3$ is, independently, an alkenyl group, alkyl group or phenyl group.

11. The method of claim 1, wherein the amounts of each of the reactants (A1) to (A3) is in the range from 1 to 100 parts by weight with respect to each other.

* * * * *